Sept. 2, 1958
J. F. VAN DAM, JR
2,850,195
LABEL APPLYING MACHINE
Filed Feb. 4, 1955
13 Sheets-Sheet 7
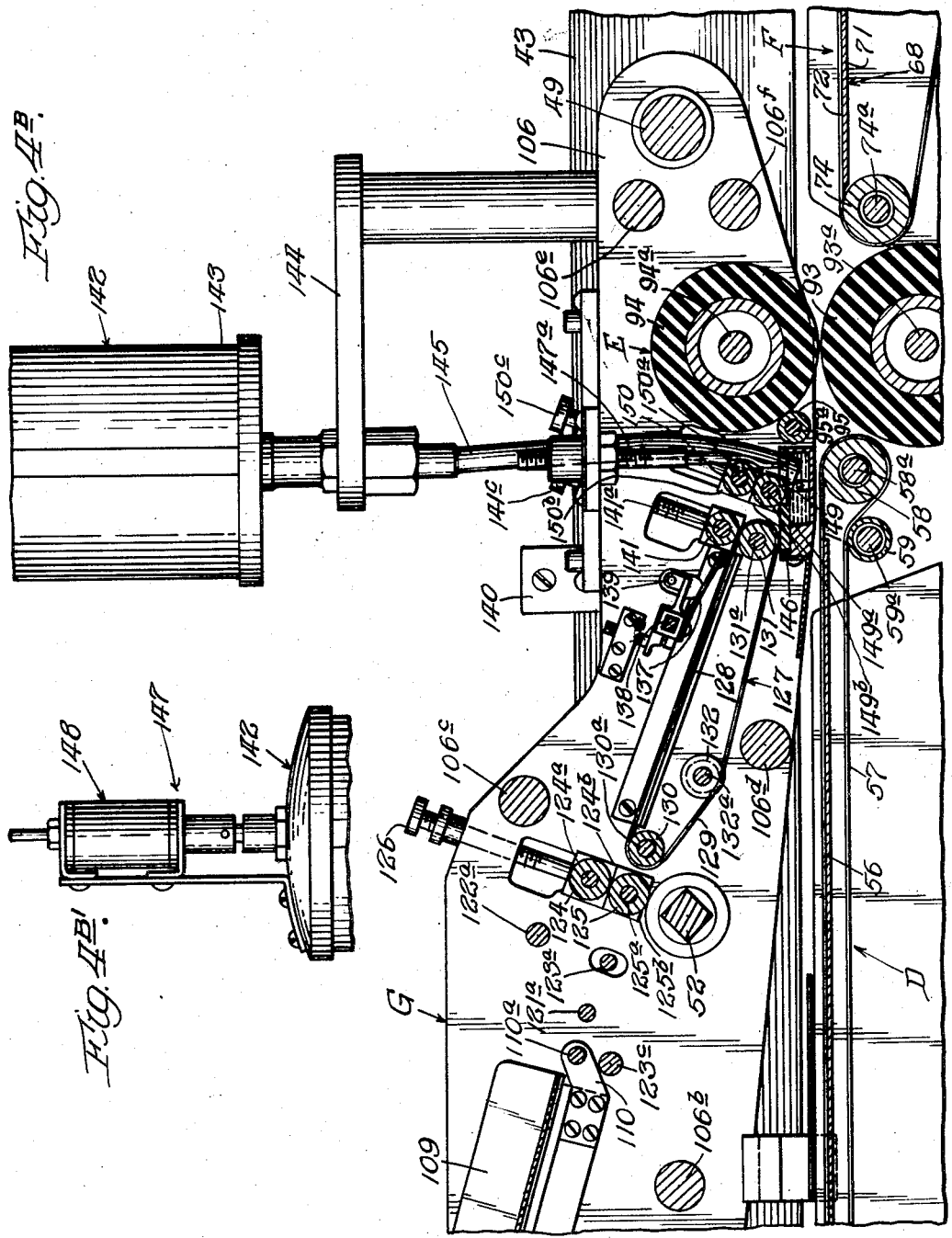
Inventor:
John F. Van Dam, Jr.,
By Schroeder, Hofgren,
Brady & Wegner, Attys.

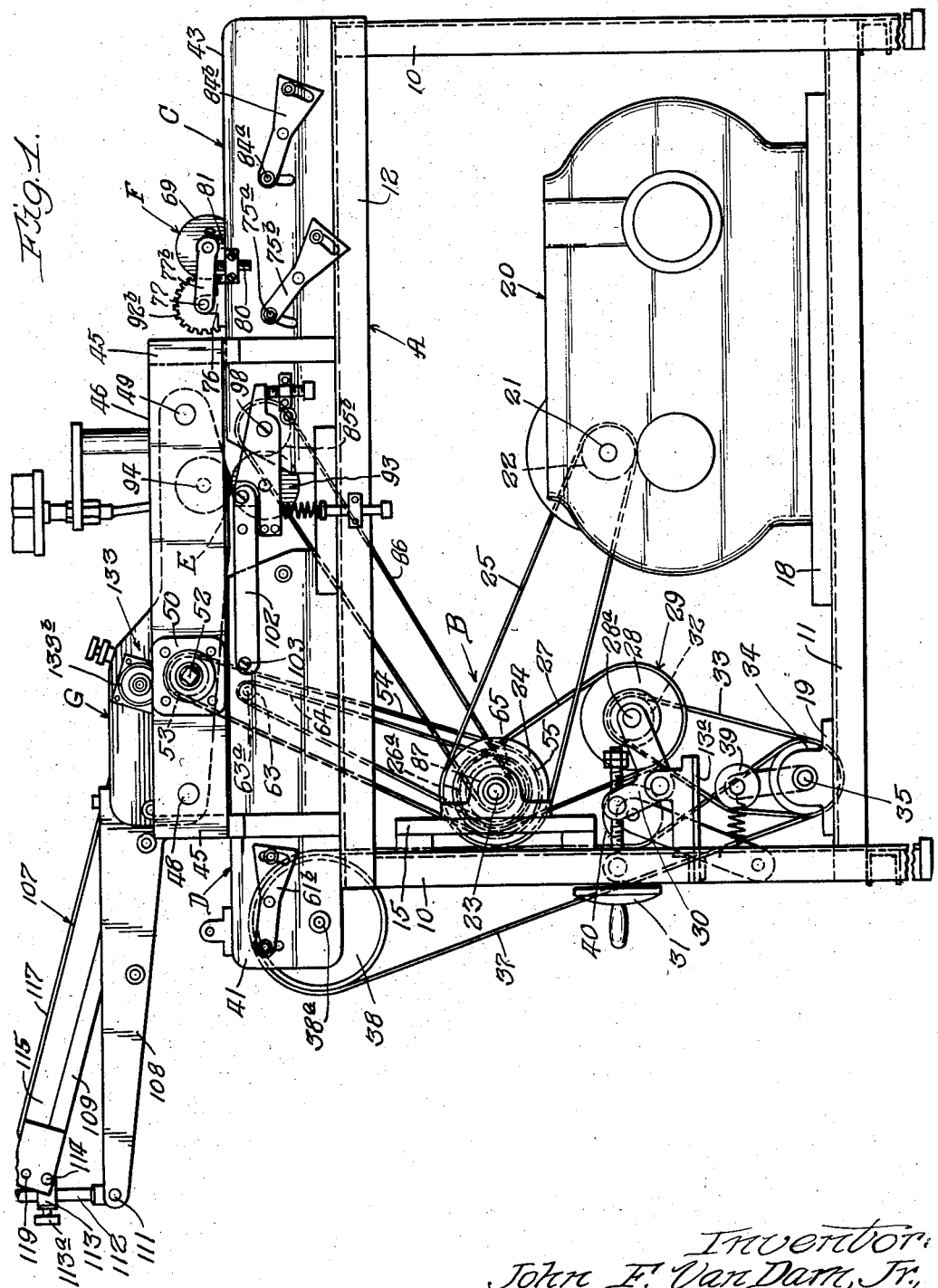

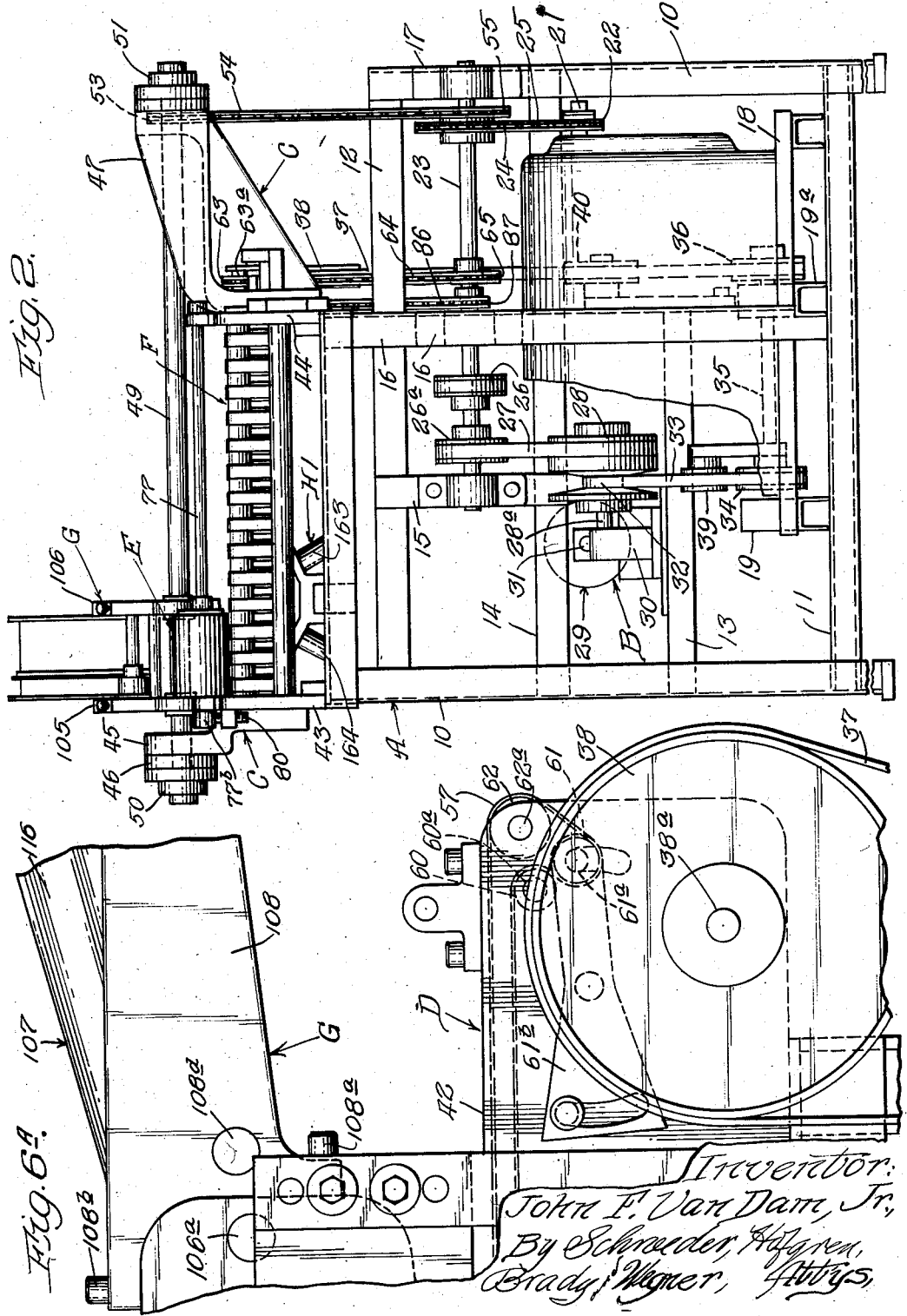

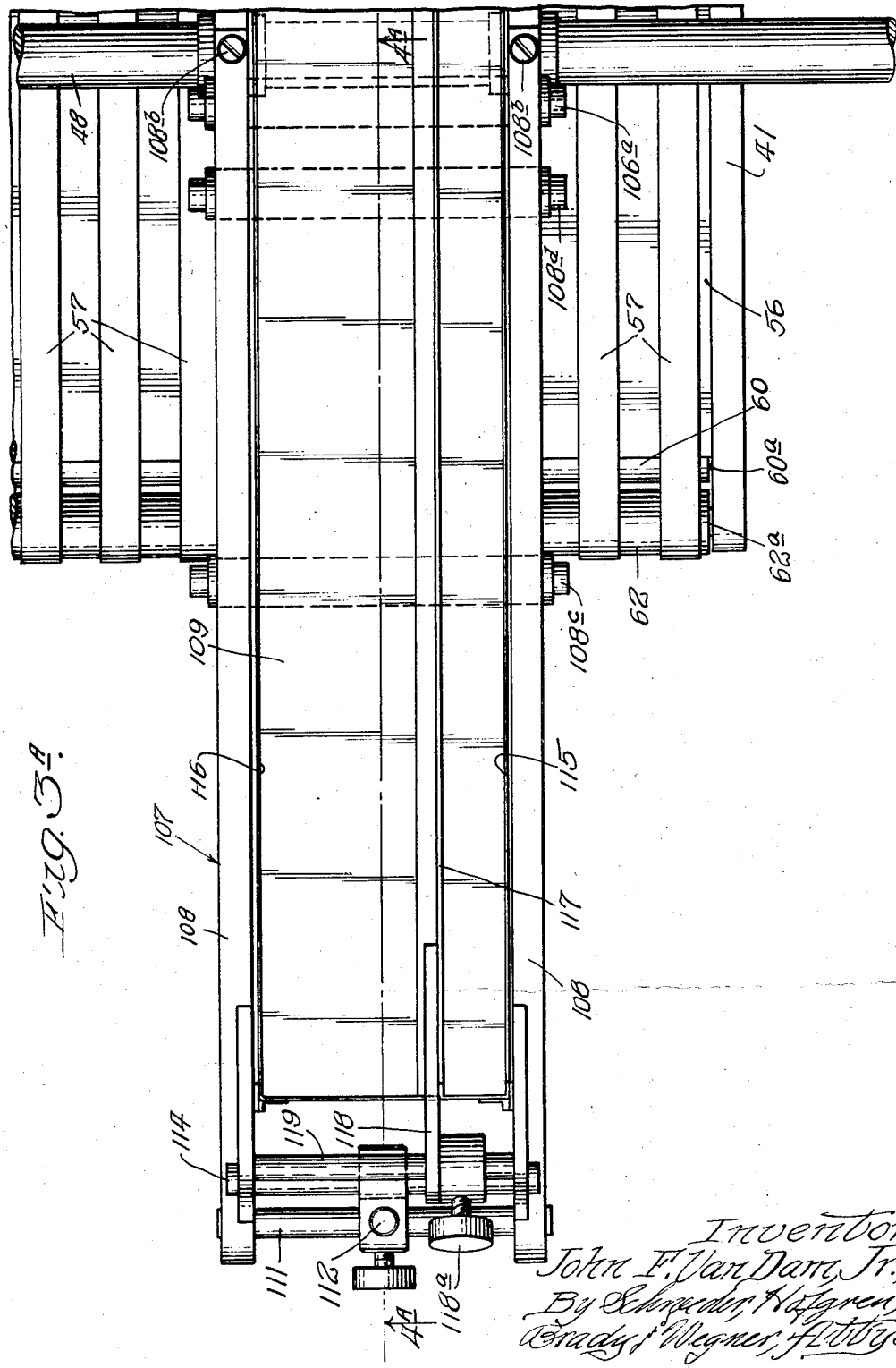

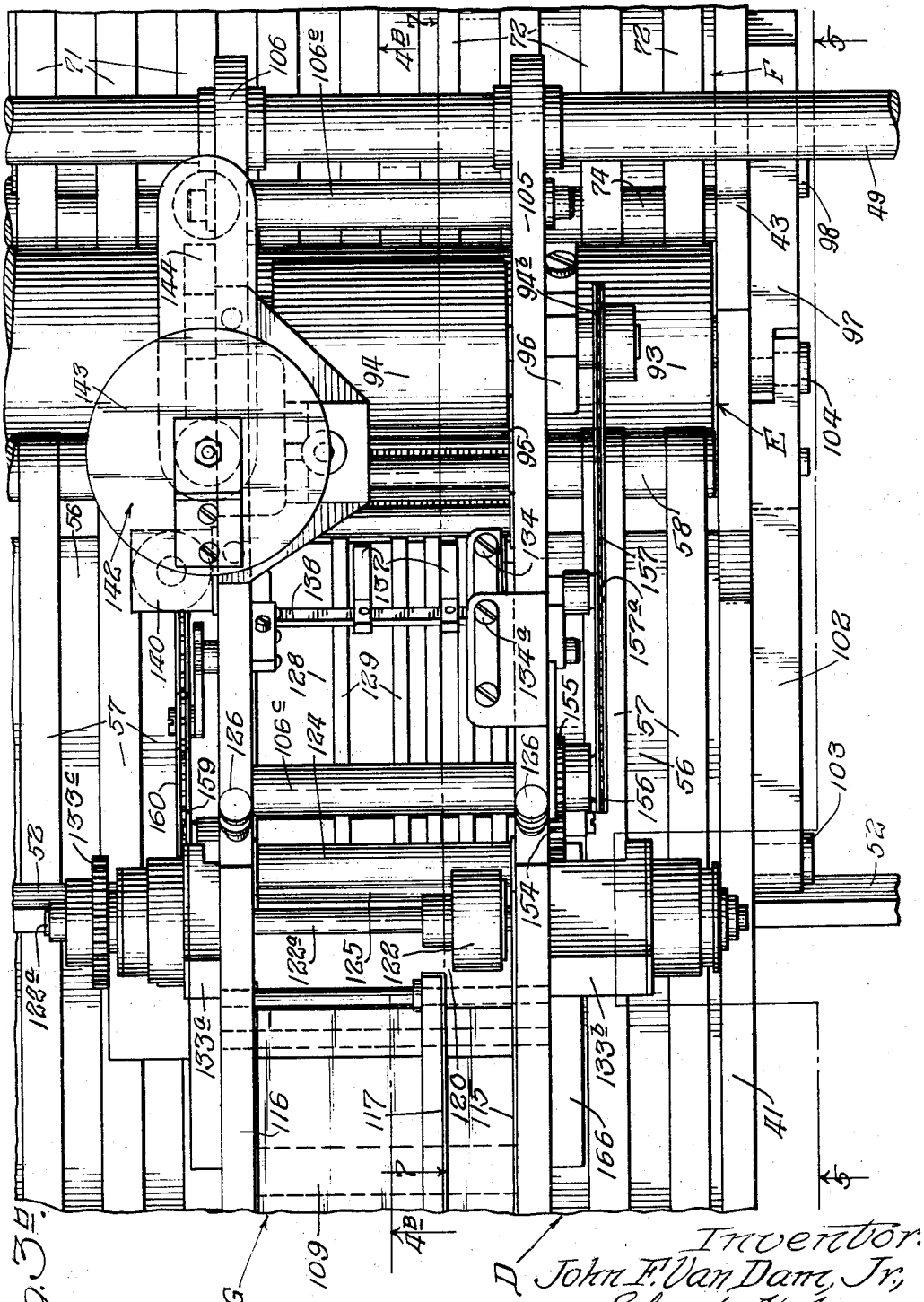

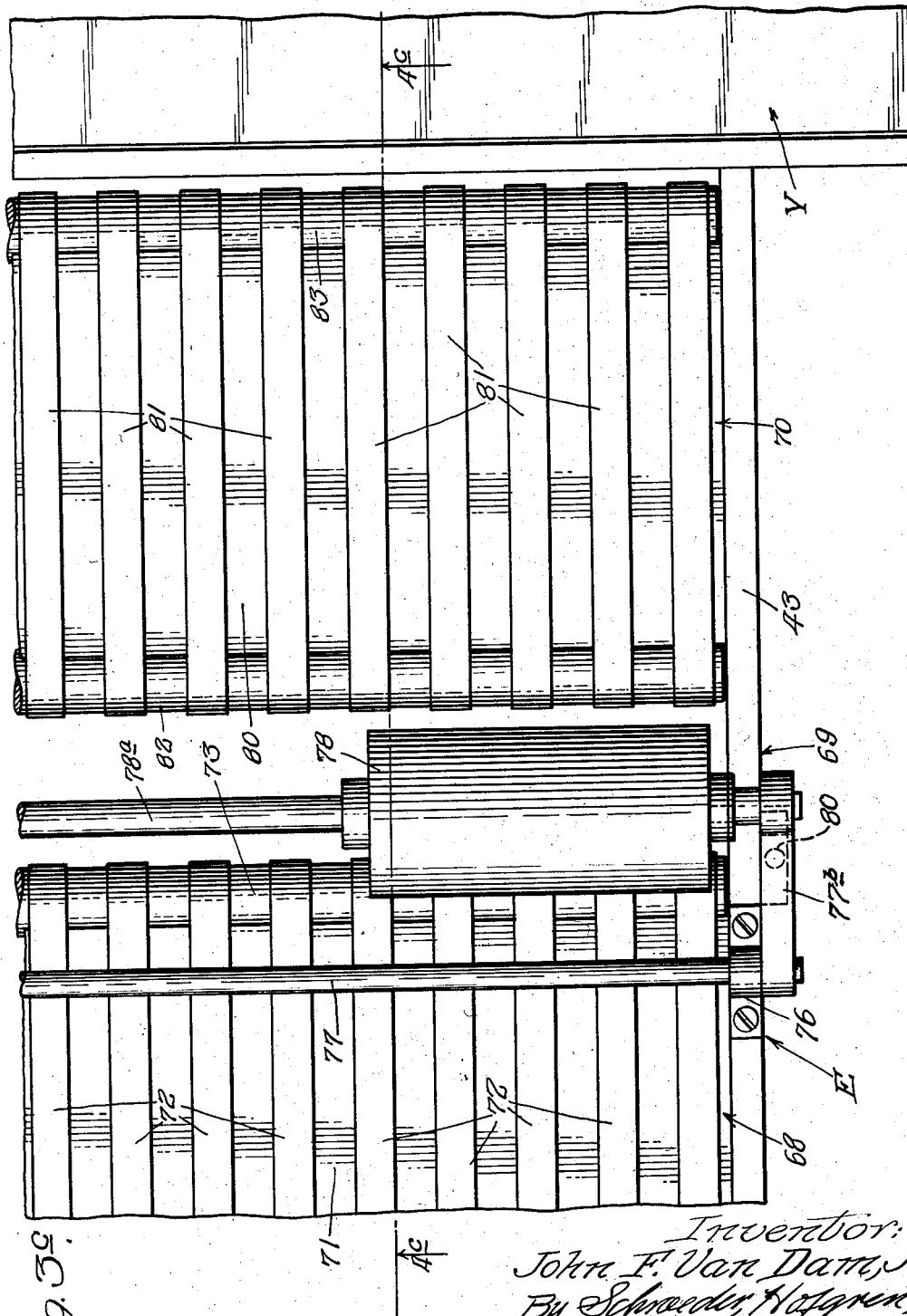

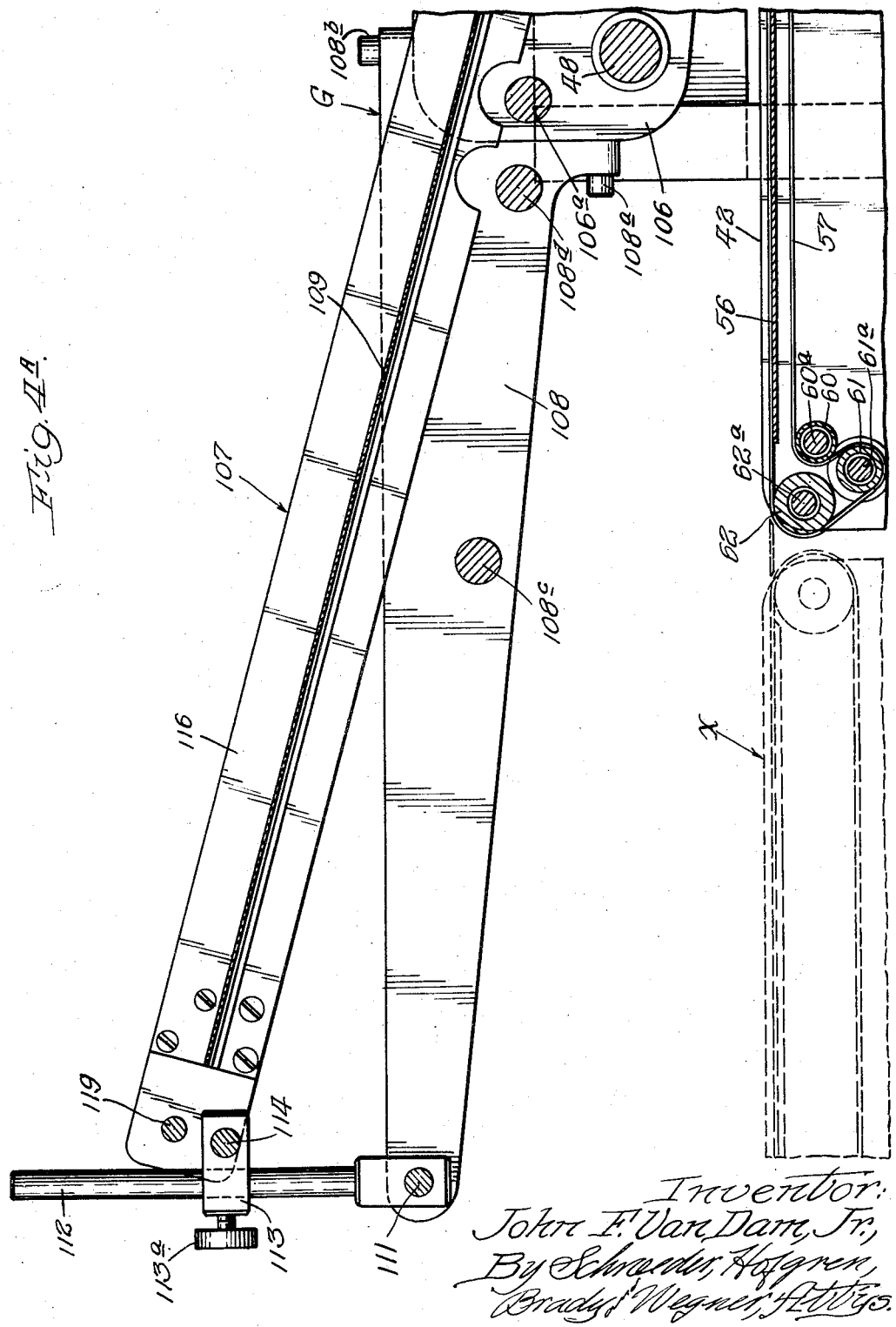

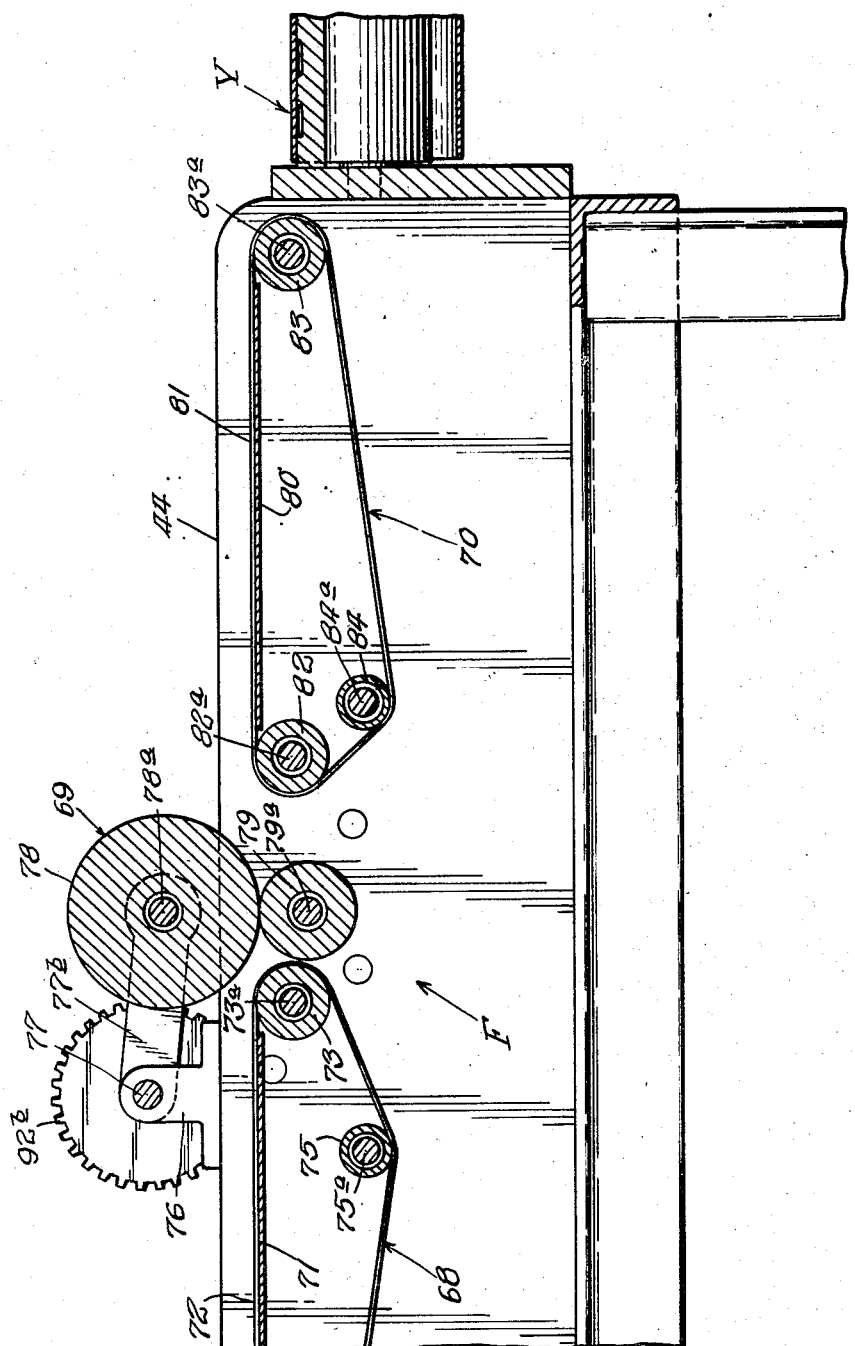

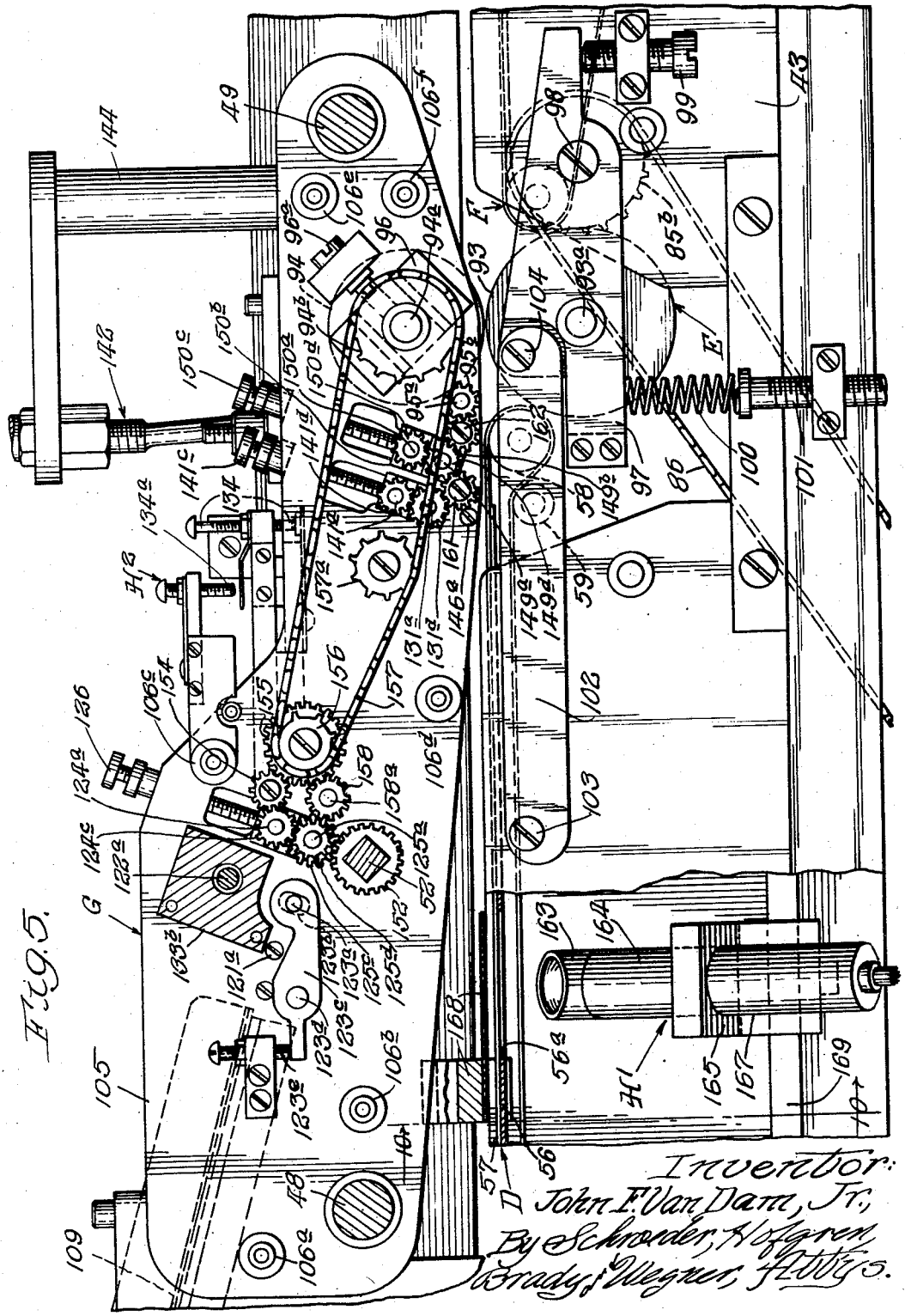

Sept. 2, 1958     J. F. VAN DAM, JR     2,850,195
LABEL APPLYING MACHINE
Filed Feb. 4, 1955     13 Sheets-Sheet 10
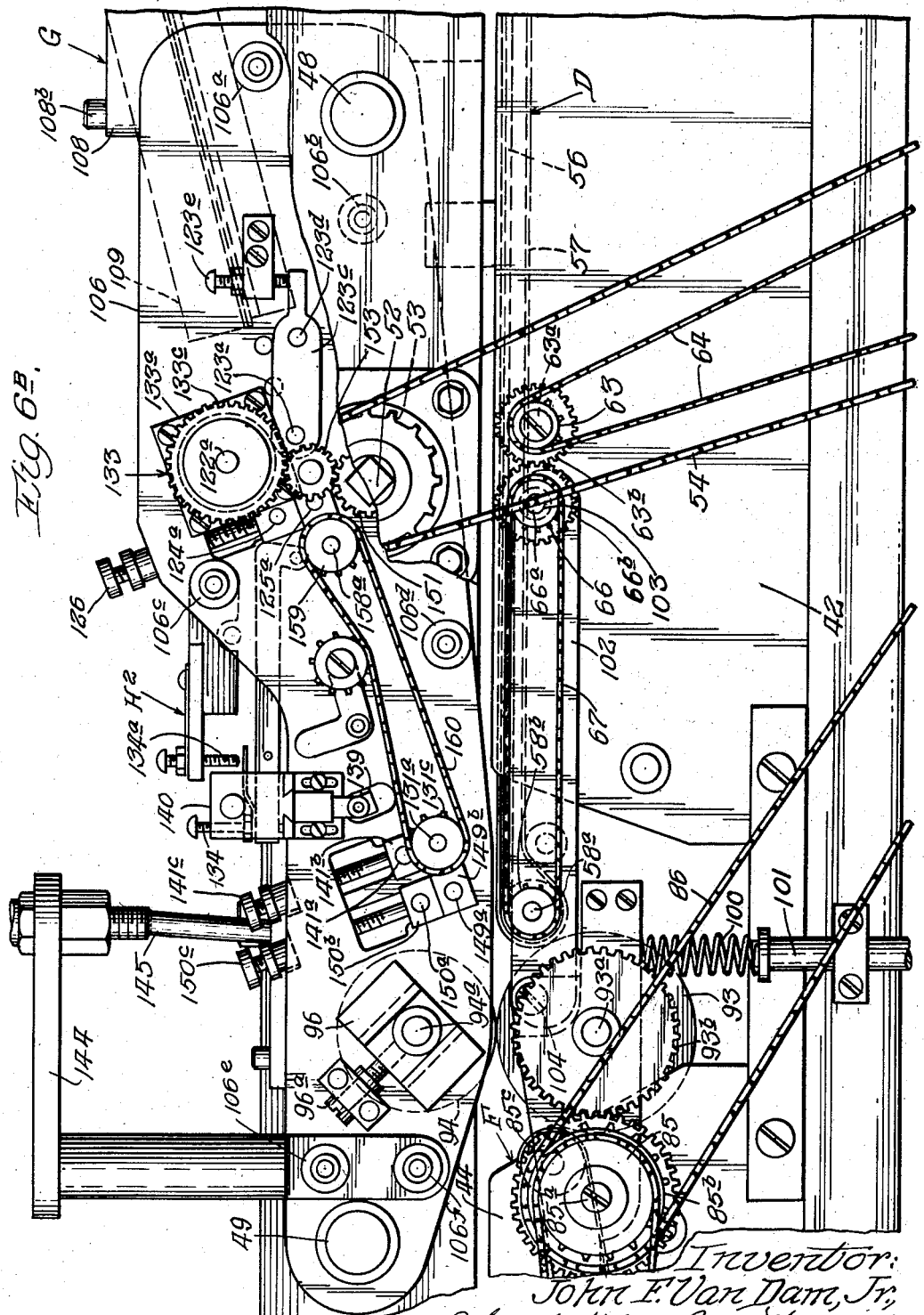
Inventor:
John F. Van Dam, Jr.
By Schroeder, Hofgren, Brady, Wegner & Lttys

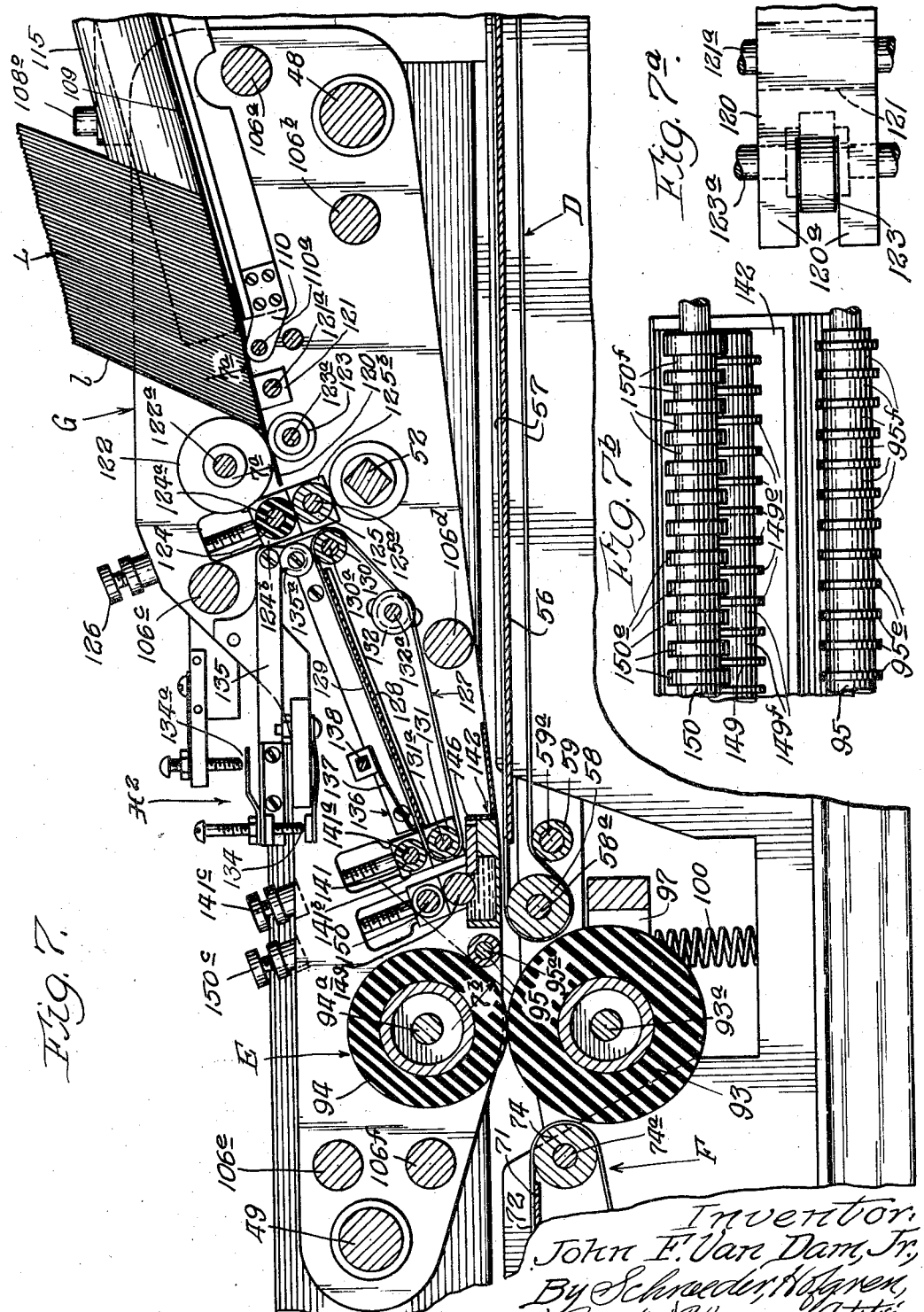

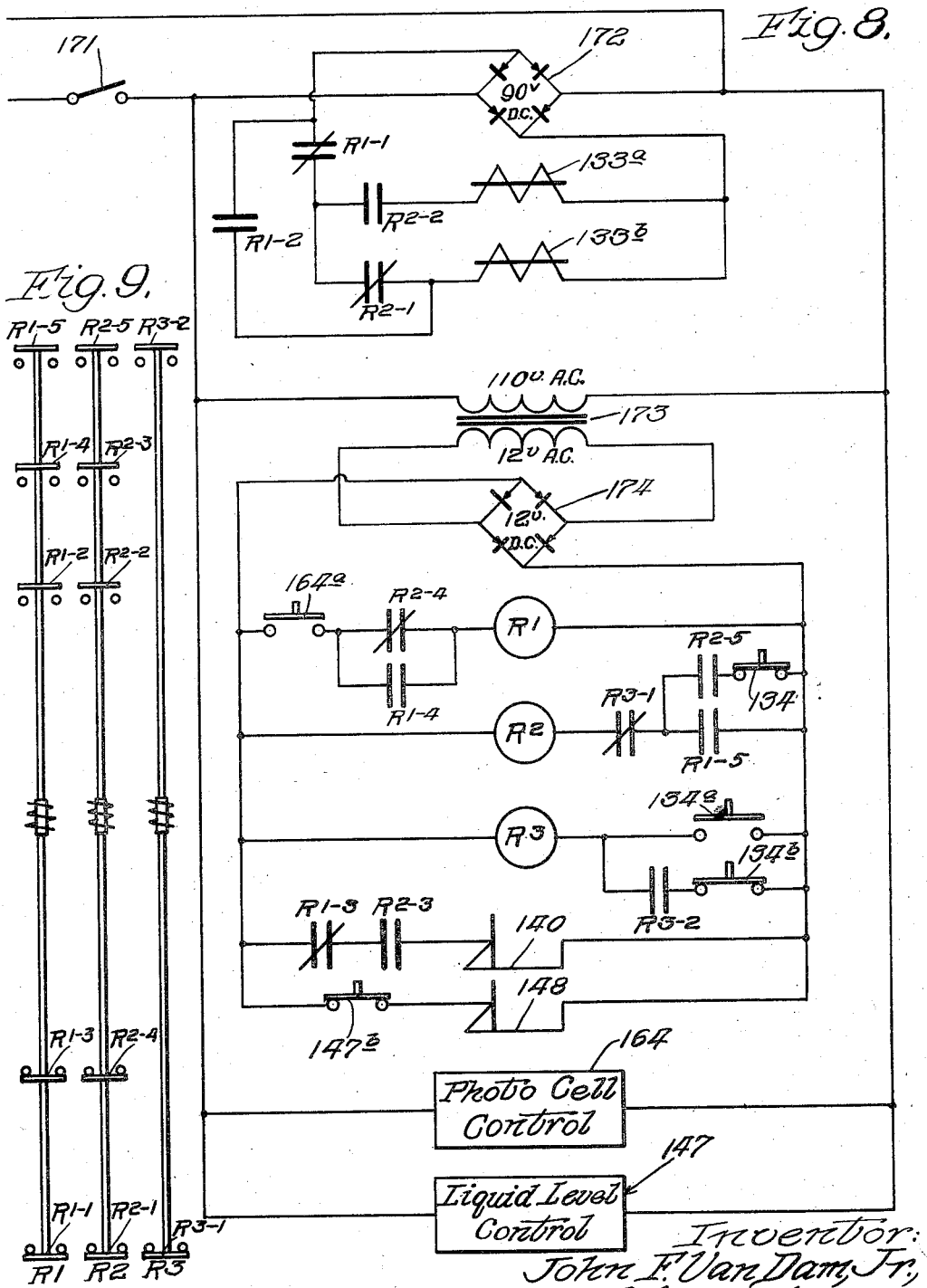

Sept. 2, 1958 J. F. VAN DAM, JR 2,850,195
LABEL APPLYING MACHINE
Filed Feb. 4, 1955 13 Sheets-Sheet 13
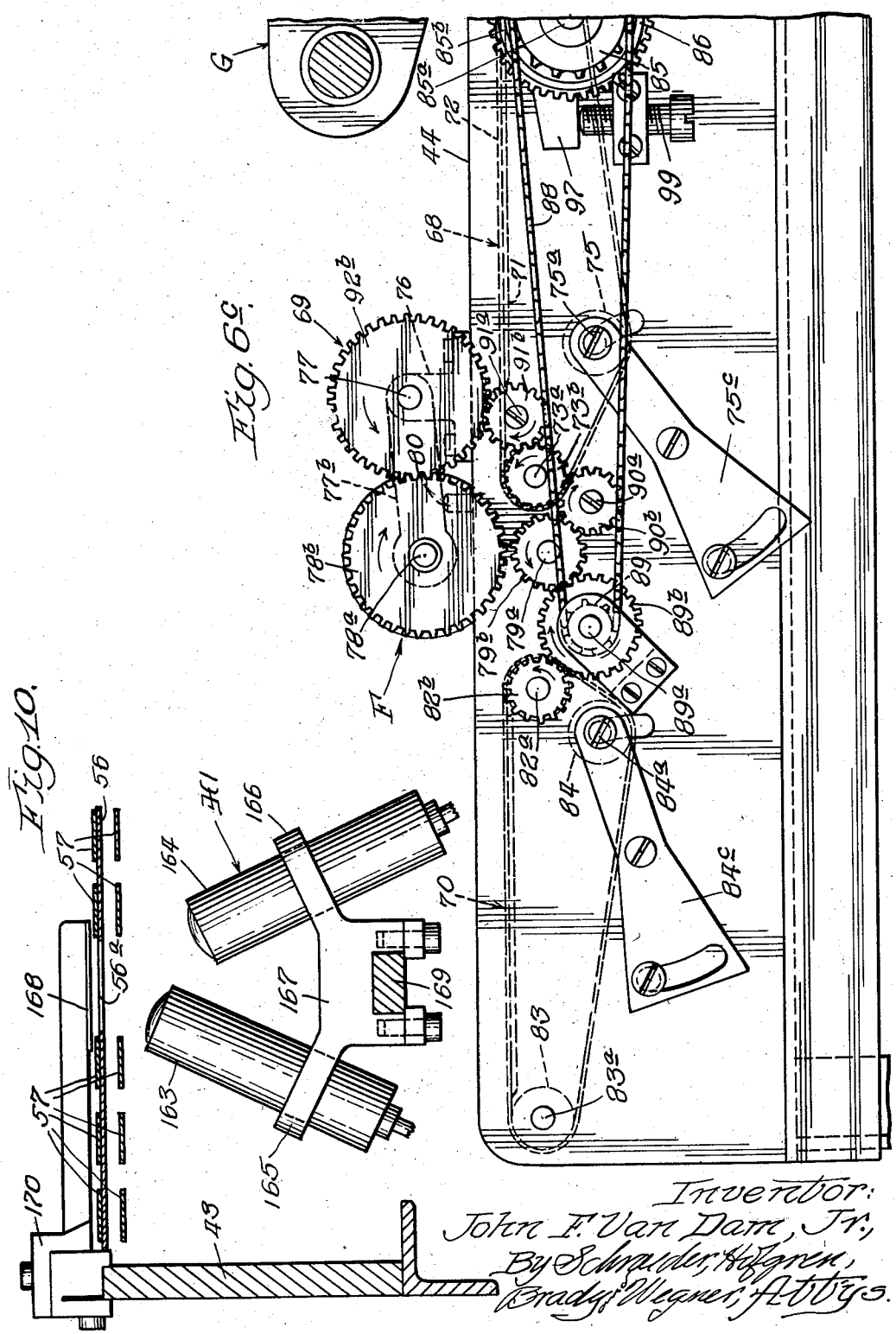
Inventor:
John F. Van Dam, Jr.,
By Schrader, Hofgren,
Brady Wegner, Attys.

United States Patent Office 2,850,195
Patented Sept. 2, 1958

2,850,195
LABEL APPLYING MACHINE

John F. Van Dam, Jr., Chicago, Ill., assignor, by mesne assignments, to Xabel Engineering Company, Chicago, Ill., a corporation of Illinois Application February 4, 1955, Serial No. 486,098

13 Claims. (Cl. 216—52)

This invention relates to a machine for applying "stacked" labels to mailing pieces. In particular, it relates to a device which may be set to apply labels of various sizes to mailing pieces or other pieces of different dimensions at various rates of speed up to a very high rate. The term "stacked labels" is used herein to define discrete labels which are not secured together in a roll or band, so that they are placed separately in a feed chute or hopper.

The principal object of the invention is to provide an improved machine for the high speed application of stacked labels to mailing pieces, and to provide such a machine which may be adapted readily to various operating conditions.

Another object of the invention is to provide a machine in which mailing pieces pass seriatim through a labeling station without stopping, and labels are delivered seriatim to the labeling station in timed relationship to the passage of the mailing pieces therethrough.

A further object of the invention is to provide a labeling machine in which the feed both for the labels and for the mailing pieces is entirely rotary, so as to eliminate the relatively slow movement of reciprocating parts.

Yet a further object of the invention is to provide a machine in which everything except the label feed roll operates continuously, and the label feed roll is operated intermittently under the control of an electromagnetic brake and clutch mechanism.

Another object of the invention is to provide a labeling machine in which the label feed may be moved transversely with respect to the mailing piece feed so that the labels may be placed at any desired position on the mailing pieces; and adjustments are also provided for varying the position of the label lengthwise of the piece.

Yet another object of the invention is to provide a machine in which the feeding of a label to the applying roll is effected by means which is under the control of the mailing piece upon which the label is to be placed, so that it is unnecessary to maintain any particular fixed spacing between mailing pieces.

The present machine is capable of operating at the very high cyclic rate of 20,000 pieces an hour. The maximum rate of operation depends, of course, upon the spacing between mailing pieces as they are fed through the machine, and the size of the mailing pieces. A variable speed drive is used, so that the cyclic rate may be reduced from the maximum for any given size mailing piece to a rate as low as about 3700 pieces an hour.

While the principal use of the machine is for the application of address labels to mailing pieces, it is obvious that it could be employed for any work in which it is desired to adhere a piece of sheet material to the face of a card, envelope or the like. Thus, for example, it might be used in greeting card manufacture to fasten decortaive pieces of foil or other sheet material on the faces of cards, or to adhere one margin only of a label or insert.

The invention is illustrated in a preferred embodiment in the accompanying drawings in which:

Fig. 1 is a side elevational view of the machine;
Fig. 2 is an end elevation viewing Fig. 1 from the right;
Figs. 3A, 3B and 3C are related fragmentary plan views which show, respectively, the infeed end, the label applying portion, and the outfeed end of the machine;
Figs. 4A, 4B and 4C are, respectively, sections taken as indicated along the lines 4A—4A, 4B—4B and 4C—4C of Figs. 3A, 3B and 3C, respectively, while Fig. 4B' is the top of the adhesive container of Fig. 4B;
Fig. 5 is a section taken as indicated along the line 5—5 of Fig. 3B;
Figs. 6A, 6B and 6C are, respectively, fragmentary side elevational views of the infeed end, the label applying portion, and the outfeed end of the machine as seen from the side opposite Fig. 1, parts of 6B being broken away;
Fig. 7 is a section taken as indicated along the line 7—7 of Fig. 3B;
Figs. 7A and 7B are fragmentary sections taken, respectively, as indicated along the lines 7A—7A and 7B—7B of Fig. 7;
Fig. 8 is a straight line diagram of the electric control for the label feed;
Fig. 9 is a key illustration of the switches and relays embodied in Fig. 8; and
Fig. 10 is an enlarged fragmentary section taken as indicated along the line 10—10 of Fig. 5.

Referring now to the drawings, and referring first to Fig. 1, the machine consists generally of a table-like supporting frame indicated generally at A; a driving and power distributing assembly indicated generally at B; a main frame C; a mailing piece infeed D (Figs. 3A and B, 4A and B and 6A and B) which receives mailing pieces from any conventional feeder (such as a Hanley feeder the delivery end of which is indicated as "X" in Fig. 4A) and feeds them to a labeling station E (Figs. 4B, 5, 6B and 7) from which they are taken by an outfeed F (Figs. 3C, 4C and 6C) which delivers them to a transverse conveyor belt (indicated as "Y" in Figs. 3C and 4C). Labels are fed to the labeling station by a label feed head G; and the feed of mailing pieces and labels to the labeling station E is coordinated by control mechanism H which includes photoelectric mailing piece sensing means H1 (Figs. 5 and 10) and electromechanical label feed control means H2 (Figs. 5, 7, 8 and 9).

Referring to the drawings in greater detail, and referring first to Figs. 1 and 2, the table supporting frame A has upright corner members 10, a motor support platform 11, a labeler platform 12, transverse lower and upper pulley brackets 13 and 14, respectively, and upright trunnion brackets 15, 16 and 17. Mounted on the motor support platform 11 is a motor base 18 and pillow blocks 19 and 19a for one of the shafts of the power distributing assembly B.

The assembly B includes an electric motor and gear reduction unit, indicated generally at 20, mounted on motor base 18, the gear reduction unit being of the variable speed type with a maximum speed about six times its minimum speed. The motor and gear reduction unit 20 has a single output shaft 21 on which is mounted a drive sprocket 22 for driving the entire labeling mechanism.

In the power distributing portion of the driving and power distributing assembly B is a main power distributing shaft 23 which is supported in trunnions on the trunnion brackets 15, 16 and 17, as best seen in Fig. 2, and adjacent one end of the main power distributing shaft 23 is a power input sprocket 24 which is connected by a roller chain 25 with the drive sprocket 22 on the output shaft 21. From the main distributing shaft 23 power is distributed by means of suitable sprockets and pulleys to all of the operating elements of the unit, and these components of the power distributing system will be described in connection with the elements which they drive.

The present machine is designed to take mailing pieces from a feeder of any conventional type, such as a Hanley feeder which has a reciprocating unit to feed mailing pieces seriatim onto conveyor tapes; and the outfeed end of such a feeder is shown in broken lines in Fig. 4A, and designated as X. For easy synchronization it is preferred to drive the feeder X off the main power distributing shaft 23. The feeder conveyor tapes (not shown) are driven through a suitable system of belts and pulleys (not shown) off a pulley 26 on the main distributing shaft 23. Drive for the reciprocating feed is through a pulley 26a, a belt 27 and an input pulley 28 of a standard variable pitch pulley assembly, indicated generally at 29. The assembly 29 has a bell crank 30 pivoted on the shaft bracket 13a which may be rocked by a hand screw 31 to change the position of shaft 28a upon which the pulley 28 is mounted, so as to change the driving relationship between a V-groove variable ratio power takeoff pulley 32 on said shaft and its variable pitch drive belt 33 which thus may drive at different speeds a feeder drive pulley 34 which is on a shaft 35 supported in the pillow blocks 19 and 19a. A pulley 36 on the shaft 35 (Fig. 2) connects through a belt 37 to a feeder drive pulley 38 on a shaft 38a. Tension on the belts 33 and 37 is maintained, respectively, by suitable idler pulleys 39 and 40. Reciprocating drive for the feeder is by suitable mechanism (not shown) including a crank on the shaft 38a; and the variable pitch pulley assembly 29 permits variation of rate of feed.

The purpose of the variable pitch pulley assembly 29 is to permit variation in the cyclic rate of the feeder X, depending upon the size of the mailing pieces which are being fed through it. Thus, for example, if the feeder is being used for six inch envelopes it may be operated at double the rate which would be employed with 12 inch envelopes, and the spacing between envelopes will remain approximately the same.

The main frame C includes longitudinal centrally spaced upright infeed side plates 41 and 42 and outfeed side plates 43 and 44. As best seen in Fig. 2, at the side of the frame adjacent side plates 41 and 43 are brackets 45 for a longitudinally extending upper side member 46, while on the side plates 42 and 44 is a wide lateral frame unit 47 the outermost portion of which is aligned with the upper side member 46. Extending between the upper side member 46 and the lateral frame unit 47 are parallel guide rails 48 and 49 to slidably receive the label feed head G. Between the guide rails 48 and 49 are bearing locks 50 and 51 in which a square labeling head drive shaft 52 is journalled. As best seen in Figs. 1 and 2, the drive shaft 52 has a sprocket 53 adjacent the lateral frame unit 47 by means of which the shaft 52 is driven by a chain 54 off a sprocket 55 on the main distributing shaft 23.

The infeed D includes a smooth top table 56 which extends from adjacent the mailing piece feeder X to a line near the labeling station E, so that mailing pieces are fed directly from the infeed into the labeling station. Referring to Figs. 4A and 4B, parallel spaced tapes 57 slide on the surface of table 56 and are trained around a drive roller 58 on a shaft 58a, downwardly over a tensioning roller 59 on a shaft 59a (Fig. 4B), underneath table 56 to a roller 60 on a shaft 60a (Fig. 4A), around a tensioning roller 61 on a movable shaft 61a which is mounted on adjusting levers 61b (Figs 1 and 6A), and around an idling roller 62 on a shaft 62a to the top of table 56. The feeder X is constructed to move mailing pieces diagonally laterally toward a guide rail on the feeder, so that they always have a margin moving parallel to the side plate 41 of the infeed D.

The drive for the infeed mechanism is best seen in Figs. 1, 2, 3B and 6B; and referring first to Fig. 6B the drive includes a sprocket 63 which is mounted upon a shoulder screw 63a which is upon the outside of side plate 44. Driving connection to the sprocket 63 is through a chain 64 from a sprocket 65 on the main distributing shaft 23. Pinned onto the sprocket 63 is a gear 63b which meshes with a gear 66b on a shoulder screw 66a, and a sprocket 66 pinned onto gear 66b receives a drive chain 67 which meshes with a sprocket 58b on the shaft 58a upon which is mounted the drive roller 58 for the infeed tape 57.

The outfeed F is best seen in Figs. 3C, 4C and 6C, while its inner end portion is seen in Figs. 4B and 6B. It includes a carry-off section indicated generally at 68 which carries labeled mailing pieces from the labeling station to the label presser unit, indicated generally at 69, from which a conveyor feed section indicated generally at 70 moves the labeled mailing pieces to the conveyor belt Y.

As seen in Figs. 4B and 4C, the carry-off section 68 includes a table 71 on which run carry-off tapes 72 which are carried over a driven roller 73 carried on a driven shaft 73a, an idling roller 74 on a shaft 74a adjacent the labeling station E, and a tensioning roller 75 on a shaft 75a which is mounted on pivoted adjusting levers 75b and 75c (see Figs. 1 and 6C).

Referring to Figs. 3C and 4C, the label presser unit 69 includes brackets 76 mounted on the side plates 43 and 44 which carry a shaft 77 for label presser arms 77b between which is journalled a presser roll shaft 78a for a top presser roll 78. As best seen in Fig. 4C, positioned directly beneath presser roll shaft 78a is a bottom presser shaft 79a for a bottom presser roll 79. The space between the top presser roll 78 and the bottom presser roll 79 may be adjusted by a screw 80 (Fig. 6C) mounted in a bracket on the side plate 44 so as to support the arm 77b; and as seen in Fig. 1 the top roll 78 is yieldingly urged against the screw 80 by means of a tension spring 81.

After passing through the presser unit 69 labeled mailing pieces are carried to the conveyor belt Y by the conveyor feeder section 70 which, as best seen in Fig. 4C, includes a table 80 upon which run conveyor tapes 81 which are carried on a drive roller 82 on a driven shaft 82a, an idling roller 83 on an idler shaft 83a, and an adjusting roller 84 on an adjusting shaft 84a which is carried on adjusting levers 84b and 84c which are seen in Figs. 1 and 6C.

The drive for the outfeed F is best seen in Figs. 1, 2, 6B and 6C, and drives all three of the elements 68, 69 and 70 of the outfeed F. Referring to Figs. 1, 2 and 6B, an outfeed drive sprocket 85b is mounted on a shoulder screw 85a in the side plate 43 and is driven through a drive chain 86 off a sprocket 87 on the main distributing shaft 23. A second sprocket 85 pinned to sprocket 85b carries a drive chain 88 which is trained over a sprocket 89 on a shaft 89a adjacent the bottom press roll shaft 79a (Fig. 6C). A gear 89b on the shaft 89a operates through appropriate gear trains to drive the elements 68, 69 and 70 of the outfeed. To drive the lower press roll 79 the gear 89b meshes directly with a gear 79b on the lower press roll shaft 79a. The drive for the carry-off element 68' is from the gear 79b through an intermediate gear 90b on a shoulder screw 90a, thence to a gear 73b on the carry-off drive shaft 73a for the carry-off conveyor tapes 72.

The upper presser roll 78 is driven from the gear 73b on the carry-off drive shaft 73 through a gear 91b on a shoulder screw 91a and a gear 92b journalled on the shaft 77 for the presser roll lever mounting arm 77b. The gear 92b in turn meshes with a gear 78b on the presser roll shaft 78a. The directions of rotation of all the gears are indicated by arrows.

The drive for the conveyor feed 70 is directly from the gear 89b to a gear 82b on the conveyor feeder drive shaft 82a.

As best seen in Figs. 4B, 5, 6B and 7, the labeling station E which is between the infeed D and outfeed F includes a lower labeling roller 93 mounted on a shaft 93a which passes through the side plates 43 and 44. An upper labeling roller 94 which is mounted on a shaft 94a at the lower end of the label feeding head G, and a label endfeed roller 95 which is mounted on a shaft 95a in the frame for said label feed head G. The rollers 93 and 94 are made of rubber to give them a resilient surface. The drive for the lower labeling roller 93 is by means of a gear 93b on shaft 93a which meshes with a gear 85c pinned to the sprockets 85 and 85b. The drive for the upper labeling roller 94 and label infeed roller 95 are off of the square shaft 52, as will be described in more detail in connection with the label feed head assembly G.

In order that they may be adjusted to accommodate mailing pieces of different thicknesses, the lower labeling roller 93 is adjustably mounted, and the lower roller is resiliently supported; and in order to permit adjustment between the upper labeling roller 94 and the label endfeed roller 95 the shaft 94a is adjustable.

These adjustable mountings are best seen in Figs. 5 and 6B. In the case of the labeling roller 94, the adjustment is obtained by means of slotted bearing blocks 96 in which the shaft 94a is slidingly mounted and positioned by means of adjusting screws 96a.

The adjustment for the lower labeling roller 93 is by means of a pair of brackets 97 which are pivotally mounted, respectively, on the shoulder screw 85a on the side plate 44 and on a pivot 98 on the side plate 43. One end of each bracket 97 is supported on an adjusting screw 99, while the other end bears on a compression spring 100 which is supported upon an adjusting stud 101. The lower labeling roller shaft 93a is journalled in the brackets 97, so that when the adjusting screw 99 is moved, the space between the lower labeling roller 93 and the upper labeling roller 94 is varied. The compression spring 100 provides a slight floating mounting for the lower labeling roller 93 so that if mailing pieces of varying thicknesses are being run at the same time, the slight variations in thickness may be accommodated by movement of the lower labeling roller. Since the pivots 98 for the brackets 97 are coaxial with the shaft 85a for the drive sprocket 85b, the distance between the drive sprocket 85b and the sprocket 87 from which it is driven does not vary with adjustment of the lever 97.

The adjustable mounting for the lower labeling roller 93 is coordinated with an adjustable mounting for the inner end of the infeed table 56. This adjustment is accomplished by means of a pair of long lever arms 102 which are pivoted at 103 on pivots coaxial with the shaft 66a on which is mounted the gear 66b for transmitting power from the shaft 63a to the driven infeed tape shaft 58a. The infeed tape shaft 58a is journalled in the adjusting brackets 102, and the inner ends of these brackets are pivotally and slidably secured to the adjusting levers 97 by means of shoulder screws 104, so that when the levers 97 are adjusted to lower the bottom labeling roller 93 the inner end of the infeed mechanism D is also lowered in accordance with the movement of the lower labeling roller. These adjustments of the lower labeling roller 93, the upper labeling roller 94, and the inner end of the infeed D permit the device of the present invention to accommodate mailing pieces of substantially varying thicknesses.

The label infeed head G is best seen in Figs. 3A and 4A, 3B and 4B, 5, 6B and 7. As previously pointed out, the label feed head G is slidably mounted on cross shafts 48 and 49, and traverses a square drive shaft 52 through which power for driving the various elements in the label feed head G is derived. As seen in Figs. 2, 5 and 6B, the label feed head G has side plates 105 and 106 which are joined and spaced by suitable stay bars, indicated as 106a to f, inclusive. The label end feed roller 95 and the slotted blocks for the top labeling roller 94, previously referred to in connection with the labeling station E, are mounted in the side plates 105 and 106.

As best seen in Figs. 3A and 4A, a label feed chute assembly, indicated generally at 107, is secured to the side plates 105 and 106 by means of label feed chute brackets 108 which are bolted at 108a and 108b to the side plates and which are provided with stay rods 108c and 108d. A label feed chute 109 has pivot brackets 110 at its inner end which are rockably supported on a pivot rod 110a (Fig. 4B), while its outer end is adjustably mounted on the feed chute brackets 108. The adjusting mounting at the outer end of the feed chute 109 includes a cross shaft 111 between the brackets 108 on which is mounted an upright adjusting post 112 to receive a rocking slide block 113 which is provided with a locking screw 113a, the slide block 113 making a pivotal connection with a cross bar 114 at the outer end of the chute 109 so that movement of the slide block 113 will raise or lower the outer end of the chute. As best seen in Fig. 3A, the chute 109 has side plates 115 and 116 between which is a longitudinally extending adjustable label guide plate 117 the outer end of which is provided with a bracket 118 which is slidably mounted on a cross member 119 and may be locked thereon by means of a locking screw 118a. The longitudinal label guide 117 permits the label feed chute 109 to accommodate labels of different widths.

As best seen in Fig. 7, the label feed chute 109 delivers a pack L of labels l which are standing on edge in face abutting relationship onto a spring steel label guide plate 120 which forms an extension of the lower end of the feed chute 109, and the outer end of which may be slightly vertically adjusted by means of a square adjusting member 121 which is mounted on a pivot 121a. Individual labels l are withdrawn seriatim from the pack of labels L by means of a label selector roller 122 which is mounted on a shaft 122a, and the feed is controlled by a label retard roller 123 on a shaft 123a which contacts the labels through a slot 120a in the guide plate 120 (see Fig. 7A). The space between the label retard roller 123 and the label selector roller 124 may be adjusted by reason of the fact that the retard roller shaft 123a extends through slots 123b in the side plates 105 and 106 and is mounted in a pair of brackets 123c which are pivoted at 123d so that they may be moved by adjusting screws 123e. The label selector roller 122 is intermittently driven as will be described in detail in connection with the control mechanism H.

From the label selector roller 122 and the label retard roller 123, a label passes between upper and lower label gripping rollers 124 and 125 which are mounted on shafts 124a and 125a, respectively. The shafts 124a and 125a are mounted in slidable bearing blocks 124b and 125b, respectively, which are held down by means of adjusting screws 126 so that the gripping rollers and their associated shafts may be readily changed or removed for cleaning or adjustment. The upper label gripping roller 124 is formed of rubber so as to get a resilient grip on the labels which are fed through it.

Immediately adjacent the label feed rollers 124 and 125 is a label conveyor unit, indicated generally at 127, which includes a smooth, inclined platform 128 upon which run a plurality of parallel spaced conveyor tapes 129. The label feed tapes 129 are trained around a roller 130 on a driven shaft 130a, around a lower roller 131 on a shaft 131a which is also driven as a part of the adhesive roller drive, and around an adjusting roller 132 which is mounted on a slidable shaft 132a to adjust the tension in the tapes 129.

The label feed head G is intended to take single labels l from the line of labels L and feed them seriatim to the labeling station E in coordination with the feed of mailing pieces to the labeling station E by the infeed D. In order to do so, the label selector roller 122 is controlled for intermittent rotation by means of standard commercial magnetic clutch and brake units, indicated generally at 133, which, as best seen in Fig. 3B, include a clutch 133a at one end of the shaft 122a and a brake 133b at the other end of said shaft. Thus, while the entire mechanism operates continuously, the label selector roller 122 may be operated intermittently to feed one label at a time out of the line of labels L in the feed chute 109 to the label conveyor unit 127 The magnetic clutch 133a and brake 133b are alternatively energized, so that when the clutch is energized, the brake is de-energized, and vice versa. Engagement of the clutch 133a and disengagement of brake 133b are controlled by the mailing piece sensing means H1 of the label feed control system H as will be described in more detail in connection with the control system. Disengagement of the clutch 133a and engagement of the brake 133b is effectuated by breaking a contact at a switch 134 on a bell crank 135 which has a switch rider roller 135a at the upper end of the label conveyor unit 127 (Fig. 7). When a single label l passes under the switch rider roller 135a, it opens the contact at the switch 134 to disengage the clutch 133a and engage the brake 133b, stopping the label selector roller 122.

The single label which has just been fed by the label selector roll 122 is carried on the tapes 129 to a label ready station 136 on the lower end of the label conveyor tapes 129 where it may lodge against a pair of pivoted stop fingers 137 which are mounted on a rock shaft 138, the movement of which is controlled through an appropriate linkage 139 (Fig. 4B) from the plunger of a stop solenoid 140 (Fig. 6B). The stop solenoid 140 is also under the control of the mailing piece sensing means H1, so that when the label selector roller 122 is actuated to pass a label to the label conveyor unit 127, the stop fingers 137 are simultaneously lifted to permit the label from the ready station to be fed on out of the conveyor unit 127.

When a label l leaves the ready station 136 it passes under a driven forwarding roller 141 on a shaft 141a which cooperates with the conveyor tapes 129 to forward the label through an adhesive applying unit indicated generally at 142. The roller shaft 141a is mounted in removable blocks, and held in place by screws 141c so that the roller may be easily changed.

As best seen in Fig. 4B, the adhesive applying unit 142 includes an adhesive supply receptacle 143 which is mounted on a bracket 144 secured to the label feed head side plate 106 by the cap nuts for the stay rods 106e and f. The adhesive receptacle 143 has an adhesive feed pipe 145 which extends downwardly into an adhesive pot 146 which is mounted in the space between the end of the label conveyor unit 127 and the labeling station E. The adhesive supply receptacle 143 is provided with a commercially available liquid level control mechanism, indicated generally at 147 (Fig. 4B') which has a feeler gauge 147a extending into the adhesive pot 146 and is in a circuit including a relay and associated switch 147b (Fig. 8) controlled thereby so that when the adhesive in the pot reaches the tip of the feeler 147a the circuit is closed to the relay. Location of the adhesive surface is controlled by adjusting the feeler A solenoid valve 148 is controlled by switch 147b to permit adhesive to flow only when the feeler circuit is open.

The adhesive applying unit 142 also includes an adhesive applying roller 149 on a shaft 149a, and a complementary label feed roller 150 on a shaft 150a, both of which are mounted in slidable bearing blocks 149b and 150b, respectively, which are held in place by screws 150c so that the rollers 149 and 150 may be easily removed for cleaning, replacement or repair.

As seen in Fig. 7B, the adhesive roller 149 has alternate circumferential lands 149e, and grooves 149f, and only the lands extend into the adhesive M in the adhesive pot 146, so that when it is rotated it can apply spaced, parallel strips of adhesive to the under surface of a label l passing between it and the roller 150. The label feed roller 150 also has lands 150e and grooves 150f with the grooves in the roller offset from those of the adhesive roller 149, so that when there is no label between the rollers 149 and 150 the adhesive bearing lands 149e register with the grooves 150f of the feed roller so that no adhesive gets into the upper roller. Likewise, the end feed roller 95, over which each label l passes as it enters the labeling station E, has lands 95e and grooves 95f which alternate with those on the adhesive roller 149 so that the end feed roller contacts the strips of the underside of the label which have no adhesive on them. Not only does the offsetting of lands and grooves on the adhesive roller 149 and on the rollers 150 and 95 permit continuous feeding of labels seriatim through the adhesive applying unit 142 and into the labeling station E, but it also provides for better distribution of adhesive than would be possible if the adhesive roller 149 had a level surface which placed adhesive over the entire surface of the label.

Reference to Figs. 4B and 7 will show that the adhesive roller 149 has its surface close against the rear margin of the adhesive pot 146, so that excess adhesive on the lands of the adhesive roller 149 may be scraped off on the rear edge of the pot as the roller turns. A wedging adjusting screw 146a, seen in Fig. 5, extends through the side plate 105 of the label feed head G so as to permit longitudinal adjustment of the adhesive pot 146 in order to control the amount of adhesive which is retained on the lands of the adhesive roller 149 as it scrapes against the rear edge of the pot 146.

The drive for all the elements in the label feed head G, including the label selector roller 122, the label gripping rollers 124 and 125, the label conveyor unit 127, the label forwarding roller 141, the adhesive unit rollers 149 and 150 and the labeling roller 94 and end feed roller 95 is obtained by appropriate sprocket and roller chain drives and gear trains, operating off of the square shaft 52. These drive arrangements are seen in Figs. 5 and 6B. As seen in Fig. 6B, journalled in the side plate 106 and slidable on shaft 52 is a gear 151, while Fig. 5 shows that at the opposite end of the square shaft 52 and journalled in side plate 105 is a gear 152. The gear 151 shown in Fig. 6B meshes with an intermediate gear 153 which in turn meshes with a gear 133c in the magnetic clutch unit 133a, so as to drive the label selector shaft 122a. All the other elements of the label feed head G are driven off the gear 152, as will now be described.

The drive from the gear 152 is into a gear 125c on the lower label gripping roller shaft 125a, so that the roller 125 is driven directly off of the gear 152. An intermediate gear 125d is coaxial with gear 125c and meshes with a gear 124c on the upper gripping roller shaft 124a so as to drive the upper gripping roller 124. From the gear 124c the power train passes through a gear 154 which is mounted on a shoulder screw in the side plate 105 and into a gear 155 which is mounted upon another shoulder screw in the side plate 105 which also supports a sprocket 156 which is pinned to the gear 155 to drive the labeling roller 95 by means of a chain 157 which is trained over the sprocket 156 and over a sprocket 94b on the labeling roller shaft 94a. An idler sprocket 157a holds tension in the chain 157.

The drive for the label forwarding roller 141, the adhesive rollers 149 and 150 and the end feed roller 95 is through a gear 158 on a shaft 158a which meshes with the gear 155. It will be noted from careful examination of Fig. 5 that gear 158 does not mesh with either of the gears 125c or 125d.

The shaft 158a extends entirely across the label feed head G, and as seen in Fig. 6B at its end which projects through the side plate 106 is a sprocket 159 which carries a chain 160 to mesh with a sprocket 131c on the shaft 131a at the lower end of the label conveyor unit 127.

Referring again to Fig. 5, at the end of the shaft 131a opposite the sprocket 131c, and outside the side plate 105 is a gear 131d which meshes directly with a gear 141d on the label forwarding roller shaft 141a, to drive said shaft. The gear 131d also engages an intermediate gear 161 which is mounted on an appropriately positioned shoulder screw in the side plate 105, and said intermediate gear 161 in turn meshes with a gear 149d which is on the shaft 149a for the adhesive roller 149. The gear 149d in turn meshes with a gear 150d which is on the shaft 150a for the label feed roller 150 which is associated with the adhesive roller 149.

Also meshing with the gear 149d is an intermediate gear 162 on a shoulder screw in the side plate 105 which in turn meshes with a gear 95b on the end feed shaft 95a so as to drive the end feed roller 95.

The operation of the labeling machine is believed to be clear from the foregoing description, and a general statement of its operation will be made here prior to describing the control system H which coordinates the movement of the labels from the label feed head G to the labeling station E with the movement of mailing pieces into the labeling station from the infeed D. When the labeling machine is operating, all of the rotating elements and belts are continuously driven except for the label selector roller 122 which, as previously pointed out, is under the control of the magnetic clutch-brake unit 133. Mailing pieces from the feeder X pass seriatim over the infeed D and into the labeling station E, and as each mailing piece approaches the labeling station its presence is indicated by the mailing piece sensing means H1 which actuates the controls H in a manner to be described so as to actuate the stop solenoid 140 and elevate the stop fingers 137, thus permitting a label held at the label ready station 136 to pass through the adhesive rollers 149 and 150 over the label end feed roller 95 into the labeling station E. The position of the mailing piece sensing means H1 and of the label ready station 136 are so coordinated with the speeds of the infeed D and the label forwarding roller 141 and adhesive rollers 149 and 150 that the mailing piece which has last affected the sensing means H1 will be at the labeling station to receive the label which is released from the ready station by the proximity of that same mailing piece to the mailing piece sensing means. Simultaneously with the release of the label from the ready station, the circuit to the magnetic clutch 133a is closed and that to the brake 133b is opened so that the label selector roller 122 may feed one more label to the ready station 136 to await the arrival of the next mailing piece.

A mailing piece and a label pass simultaneously between the labeling roller 94 and the lower roller 93 of the labeling station so that the adhesive coated underside of the label is adhered to the mailing piece, and the labelled mailing piece is then picked up by the carry-off section 68 of the outfeed F, passes through the presser roll unit 69 and is delivered by the conveyor feed 70 to the conveyor belt Y for travel to a packing table.

Referring now particularly to Figs. 5 and 10, the mailing piece sensing means H1 includes a light source 163 and a photoelectric cell 164 which are mounted, respectively, on suitable brackets arms 165 and 166 on a sliding head 167 so that the photoelectirc cell 164 lies at the angle of incidence of a beam from the light source 163 which is projected against a mirror 168 above the table 56, the light beam from the light source passing through a slot 56a in the table to the mirror. The sliding head 167 is carried on a suitable bracket 169 mounted on the table A under the infeed table 56, while the mirror 166 is carried on a sliding bracket 170 above the infeed table. Thus, both the sliding head 167 carrying the light source 163 and the photoelectric cell 164, and the sliding bracket 170 carrying the mirror 168 may be adjusted longitudinally with respect to the infeed D and the labeling station E in order to obtain the proper coordination between the arrival of a mailing piece and the arrival of a label at the labeling station.

Referring now to Figs. 8 and 9, the electrical control portion of the label feed control H includes a manual master switch 171 which controls the overall operation of the control components. The control circuit elements include a 90 v. D. C. rectifier 172 in the circuit for the magnetic clutch 133a and the magnetic brake 133b. Another portion of the control circuit includes a transformer 173 which converts from 110 v. A. C. to 12 v. A. C., and off the 12 v. A. C. side of the transformer is a rectifier 174 to provide 12 v. D. C. for the control relays R1, R2 and R3 and for solenoids 140 and 148. The relay R1 is energized through the circuit including the normally open switch 164a in the photocell control and relay contacts R2–4, so that R1 is normally not energized. R2 is also normally deenergized because the circuits to it are broken by the open contacts R1–5 and R2–5.

As indicated by the diagrammatic illustration of the relays, Fig. 9, each of the relays R1 and R2 is provided with five contacts which operate simultaneously, and in the condition of the control mechanism illustrated in the wiring diagram, Fig. 8, which is a "normal," or "battery" condition, the relay contacts R1–1 and R1–3 are closed, while the relay contacts R1–2, R1–4 and R1–5 are open. Similarly, the relays R2–1 and R2–4 are closed while the relays R2–2, R2–3 and R2–5 are open. Relay R3 is a two contact relay with R3–1 normally closed and R3–2 normally open.

Contacts R1–1 and R2–1 provide a normally closed circuit to the magnetic brake 133b while contact R1–2 provides a holding circuit for the brake. Open contact R2–2 leaves the clutch 133a normally disengaged, and the clutch remains disengaged until both R1–1 and R2–2 are closed.

R1–4 and R2–4 furnish alternative circuits to R1, while R1–5 and R2–5 furnish alternative circuits to R2. R1–3 and R2–3 are in the circuit for stop finger solenoid 140, and must both be closed to actuate the solenoid.

The controls are shown in the position that they occupy immediately before a mailing piece breaks the beam from the light source 163 to the photoelectric cell 164.

The relay R3 is not ordinarily used in the regular operation of the device. As seen in Fig. 7, there is a switch 134a immediately above the switch 134, and the contacts at 134 and 134a are so adjusted that if two labels pass under the switch rider roller 135 the second contact 134a will be closed and this will result in a stopping of the machine in a manner which will be described. The relay R3 is involved only in this operation.

Since the liquid level control 147 is a commercially purchased unit it is shown in the wiring diagram only for the purpose of indicating the connections to the solenoid 148 and the switch 147b in the liquid level control, as no further detail is believed necessary.

When a mailing piece passing over the slot 56a in the infeed table 56 interrupts the light beam of the photoelectric cell 164, the control switch 164a in the photoelectric unit closes making the circuit to R1 momentarily through R2–4.

The first operations of the control unit H are only to condition the relays for further operation. Actuation of R1 closes the contact R1–5, providing a closed circuit to R2 to energize that relay. This immediately also closes contact R2–5, leaving alternative connections to R2. Although the circuit to the brake 133b through the contacts R1–1 and R2–1 is broken, a holding circuit through the contacts R1-2 is closed at this time so that the brake 133b is still on. Conversely, although the circuit is closed through the contacts R2-2 for the magnetic clutch 133a, this circuit is still broken because of the opening of the contact R1-1. Likewise, the circuit to the stop finger solenoid 140 has been opened at the relay R1-3 a fraction ahead of the closing of the contacts R2-3 in the same circuit, so the solenoid has not been energized.

The opening of the contacts R2-4 in the circuit to R-1 is compensated for by the closing of the associated contacts R1-4 for the relay R1, so that as soon as the mailing piece passes the sensing means H1 and the light beam is again projected to the photocell 164, the photocell switch 164a may again open the circuit to the relay R1 through R1-4, de-energizing R1 to disengage the brake, engage the clutch, and operate the stop finger solenoid 140.

When this takes place, operation of R1 returns all the R1 series contacts to their normal positions as shown in Fig. 8. However, this does not affect the operation of R2, because there is still a closed circuit to R2 through contacts R2-5 and switch 134. Thus, the circuit for the brake 133b is broken at R1-2 to de-energize the brake. R2-2 is in the circuit for clutch 133a remains closed, and the reclosing of R1-1 in the clutch circuit energizes the clutch. This operates the label selector roller 122 to feed the first label off of the pack L of labels. At the same time, the relay R1-3 closes and since R2-3 was already closed the stop finger solenoid 140 is energized to elevate the stop fingers, permitting a label to pass out of the label ready station 136 and through the adhesive rollers to the labeling station E. As soon as the label being passed under the label selector roll 122 and through the label gripping rolls 124 and 125 strikes the switch rider wheel 135a, it opens the switch 134, thus breaking the holding circuit for the relay R2 and returning all the contacts of relay R2 to their battery positions. This again de-energizes the clutch by breaking the circuit at contacts R2-2 and energizes the brake by making contact at R2-1. Likewise, R2-3 opens to again break the circuit to the stop finger solenoid 140.

The space between mailing pieces need be only great enough to allow the light beam to strike the photocell 164 for the short period of time necessary to break contact on switch 164a. If the light beam is again interrupted before a label has completed feeding, it will have no effect, as R1 cannot be re-energized until contact R1-4 has been closed. However, when contact R2-4 closes, R1 will immediately become energized, starting a new cycle.

In the event that the label selector roller 122 feeds two labels at a time, the extra movement of the switch rider wheel 135a as the two labels pass under it closes the contact 134a to energize the relay R3. This opens the contact R3-1 and closes the contact R3-2, breaking the circuit to the relay R2 and establishing a holding circuit for R3 through a reset switch 134b and the contacts R3-2.

Opening the circuit to R2 does not take place until after the label at the ready station has been released for travel to the labeling station, but on the other hand, opening of the circuit for R2 at contacts R3-1 means that when the next mailing piece closes the switch 164a of the photocell control 164 to operate the relay R1, it cannot energize the relay R2, so that no more labels can be fed either to the labeling station or to the ready station until the extra label has been removed from the ready station and the reset switch opened to break the circuit to the relay R3 and restore the circuit to R2 at contacts R3-1.

The fact that no labels are fed while mailing pieces continue to pass through the labeling station E is of no consequence, since the unlabelled mailing pieces may simply be picked off the conveyor belt Y and returned to the feeder X for reprocessing.

The foregoing detailed description is given for clearness of understanding only and no unnecessary limitations should be understood therefrom, as modifications will be obvious to those skilled in the art.

I claim:

1. In a mechanism for feeding individual sheets to a processing station in juxtaposition with pieces moving through said station: a sheet supply; continuously moving means for carrying discrete sheets from said supply to the processing station; intermittently operable feed mechanism adapted to feed a sheet from the supply onto the continuously moving means for travel on said means to the processing station; means for actuating said feed mechanism in response to a signal for delivery of a sheet to the station; sheet sensing means associated with the continuously moving means immediately adjacent said feed mechanism; and means actuated by detection of a sheet by said sensing means for stopping said feed mechanism.

2. In a mechanism for feeding individual sheets to a station in precise predetermined relationship to pieces moving through said station: a sheet supply; continuously moving means for supporting and carrying discrete sheets from said supply to the station; a low inertia stop member positioned above said continuously moving means and having a normal position where it arrests a sheet on said continuously moving means; initial feed mechanism for feeding sheets individually from the sheet supply onto the continuously moving means for travel on said means to the stop member; sensing means for detecting a piece approaching the station; and sheet feed control means actuated in response to detection of a piece by said sensing means for elevating said stop member to release a sheet for travel to the station.

3. In a mechanism for feeding individual sheets to a processing station in juxtaposition with pieces moving through said station: a sheet supply adapted to hold discrete sheets in a pack; continuously moving means for carrying discrete sheets from said supply to the processing station; rotary feed mechanism adapted to frictionally engage the front sheet in a pack and feed it out of the sheet supply; means for intermittently actuating said feed mechanism in response to a signal for delivery of a sheet to the station; sheet sensing means associated with the continuously moving means immediately adjacent said rotary mechanism; and means actuated by detection of a sheet by said sensing means for stopping said rotary mechanism.

4. In a mechanism for feeding individual sheets to a processing station in precise predetermined relationship to pieces moving through said station: a sheet supply; continuously moving means for supporting and carrying discrete sheets from said supply to the processing station; a low inertia stop member positioned above said continuously moving means and having a normal position where it arrests a sheet on said continuously moving means; initial feed mechanism for feeding sheets individually from the sheet supply onto the continuously moving means for travel on said means to the stop member; sensing means for detecting a piece approaching the station; sheet feed control means actuated in response to detection of a piece by said sensing means for elevating said stop member to release a sheet for travel to the station; and initial feed operating means for momentarily operating said initial feed mechanism to feed a single sheet onto the continuously moving means in conjunction with each actuation of the stop member.

5. In a labeling machine: a labeling station including means for applying a moving label to a moving piece; feed means for passing continuously moving pieces through said labeling station; a label supply; continuously moving means for supporting and carrying discrete labels from said supply to the labeling station; a low inertia stop member positioned above said continuously moving means and having a normal position where it arrests a label on said continuously moving means; initial feed mechanism for feeding a label from the label supply onto the continuously moving means for travel on said means into contact with the stop member; and label feed control means for elevating said stop member to release a label each time a piece approaching the labeling station reaches a predetermined point.

6. The device of claim 5 which includes double label sensing means for detecting the simultaneous passage of two labels through the initial feed means, and cutoff means under the control of said double label sensing means for disabling the initial feed means.

7. In a labeling machine; a labeling station including means for applying a moving label to a moving piece; feed means for passing continuously moving pieces through said labeling station; a label supply; continuously moving means for carrying discrete labels from said supply to the labeling station; initial feed means for feeding labels singly from the label supply onto said continuously moving means; control means for intermittently starting said initial feed means in timed relationship with the movement of pieces toward the labeling station; label sensing means immediately adjacent said inital feed means; and means actuated by detecton of a label by said label sensing means for stopping said initial feed means.

8. In a labeling machine: a labeling station including means for applying a moving label to a moving piece; feed means for passing continuously moving pieces through said labeling station; a label supply; continuously moving means for carrying discrete labels from said supply to the labeling station; a stop member having a normal position where it arrests a label on said continuously moving means; initial feed mechanism for feeding a label from the label supply onto the continuously moving means for travel on said means into contact with the stop member; label feed control means for moving said stop member to release a label each time a piece approaching the labeling station reaches a predetermined point; label sensing means between the initial feed means and the stop member; and means responsive to detection of a label by said label sensing means for returning the stop member to it normal position.

9. The device of claim 8 which includes means for stopping the initial feed means in response to detection of a label by the label sensing means.

10. In a labeling machine: a labeling station including means for applying a moving label to a moving piece; feed means for passing continuously moving pieces through said labeling station; a label supply; continuously moving means for carrying a discrete labels from said supply to the labeling station; a stop member having a normal position where it arrests a label on said continuously moving means; initial feed mechanism for feeding a label from the label supply onto the continuously moving means for travel on said means into contact with the stop member; label feed control means for moving said stop member to release a label each time a piece approaching the labeling station reaches a predetermined point; label sensing means between the initial feed means and the stop member; and means for stopping the initial feed means in response to detection of a label by the label sensing means.

11. In a labeling machine: a labeling station including means for applying a moving label to a moving piece; feed means for passing continuously moving pieces through said labeling station; a label supply; continuously moving means for carrying discrete labels from said supply to the labeling station; a stop member having a normal position where it arrests a label on said continuously moving means; initial feed mechanism for feeding a label from the label supply onto the continuously moving means for travel on said means into contact with the stop member; label feed control means for moving said stop member to release a label each time a piece approaching the labeling station reaches a predetermined point; label sensing means between the initial feed means and the stop member; means for stopping the initial feed means in response to detection of a label by the label sensing means; and cutoff means for disabling the initial feed means in response to simultaneous detection of two labels by said label sensing means.

12. In a mechanism for feeding individual sheets to a station in precise predetermined relationship to pieces moving through said station: a sheet supply; continuously moving means for supporting and carrying discrete sheets from said supply to the station; a pivoted stop member of low inertia having a finger which normally contacts said continuously moving means to arrest a sheet thereon; initial feed mechanism for feeding sheets individually from the sheet supply onto the continuously moving means for travel on said means to the stop member; sensing means for detecting a piece approaching the station; and sheet feed control means actuated in response to detection of a piece by said sensing means for pivoting said stop member to release a sheet for travel to the station.

13. In a labeling machine: a labeling station provided with opposed applying rollers; feed means for passing pieces seriatim between said applying rollers; label feed means for feeding labels seriatim into the labeling station and onto a mailing piece for adherence thereto by the applying rollers; coordinating means for controlling the feed of labels into the labeling station; and adhesive applying means between the label feed means and the labeling station including an adhesive applying roller having circumferential adhesive applying lands separated by non-adhesive bearing grooves, a label feed roller which forms a nip with said adhesive roller, said feed roller having label contacting lands aligned with the grooves in said adhesive applying rollers and grooves positioned to avoid contact of said feed roller with adhesive, and an end feel roller having lands which contact the adhesive coated side of the label between the strips of adhesive applied by the adhesive roller, said end feel roller guiding the label onto the mailing piece and between said applying rollers.

References Cited in the file of this patent

UNITED STATES PATENTS

| | | |
|---|---|---|
| 1,652,040 | Molins | Dec. 6, 1927 |
| 2,029,394 | Sidebotham | Feb. 4, 1936 |
| 2,484,701 | Flynn | Oct. 11, 1949 |
| 2,555,325 | Doane | June 5, 1951 |
| 2,575,887 | Nitchie | Nov. 20, 1951 |
| 2,670,954 | Bach | Mar. 2, 1954 |
| 2,726,003 | Govatsos | Dec. 6, 1955 |